(12) United States Patent
Netzer

(10) Patent No.: US 11,120,793 B2
(45) Date of Patent: Sep. 14, 2021

(54) AUTOMATIC SPEECH RECOGNITION

(71) Applicant: VoicEncode Ltd, Kfar-Saba (IL)

(72) Inventor: Omry Netzer, Kfar-Saba (IL)

(73) Assignee: VoicEncode Ltd., Kfar-Saba (IL)

( * ) Notice: Subject to any disclaimer, the term of this patent is extended or adjusted under 35 U.S.C. 154(b) by 109 days.

(21) Appl. No.: 16/309,585

(22) PCT Filed: Jun. 11, 2017

(86) PCT No.: PCT/IL2017/050648
§ 371 (c)(1),
(2) Date: Dec. 13, 2018

(87) PCT Pub. No.: WO2017/216786
PCT Pub. Date: Dec. 21, 2017

(65) Prior Publication Data
US 2019/0371320 A1    Dec. 5, 2019

Related U.S. Application Data

(60) Provisional application No. 62/349,676, filed on Jun. 14, 2016.

(51) Int. Cl.
| | | |
|---|---|---|
| *G10L 15/22* | (2006.01) | |
| *G06K 9/32* | (2006.01) | |
| *G06K 9/46* | (2006.01) | |
| *G10L 15/02* | (2006.01) | |
| *G10L 15/30* | (2013.01) | |
| *G10L 25/18* | (2013.01) | |

(52) U.S. Cl.
CPC ............ *G10L 15/22* (2013.01); *G06K 9/3233* (2013.01); *G06K 9/46* (2013.01); *G10L 15/02* (2013.01); *G10L 15/30* (2013.01); *G10L 25/18* (2013.01)

(58) Field of Classification Search
CPC ......... G10L 15/22; G10L 15/02; G10L 15/30; G10L 25/18; G06K 9/323; G06K 9/46
See application file for complete search history.

(56) References Cited

U.S. PATENT DOCUMENTS

| | | | |
|---|---|---|---|
| 6,092,039 A | 7/2000 | Zingher | |
| 9,072,478 B1 * | 7/2015 | Feerst | A61B 5/163 |

(Continued)

FOREIGN PATENT DOCUMENTS

WO    WO 2017/216786    12/2017

OTHER PUBLICATIONS

Coensel et al. "A model of saliency-based auditory attention to environmental sound", 2010, International Congress on Acoustics, p. 1-5 (Year: 2010).*

(Continued)

*Primary Examiner* — Sonia L Gay

(57) ABSTRACT

It is depicts a method of speech recognition, sequentially executed by a processor on consecutive speech segments that comprises: obtaining digital information, which is a spectrogram representation, of a speech segment, and extracting from it speech features that characterizes the segment from the spectrogram representation. Then, a consistent structure segment vector based on the speech features is determined onto which machine learning is deployed to determine at least one label of the segment vector. A method of voice recognition and image recognition sequentially executed by a processor, on consecutive voice segments is also described. A system for executing speech, voice, and image recognition is also provided that comprises client devices to obtain and display information, a segment vector generator to determine a consistent structure segment vector based on features, and a machine learning server to determine at least one label of the segment vector.

15 Claims, 10 Drawing Sheets

(56) References Cited

U.S. PATENT DOCUMENTS

| | | | |
|---|---|---|---|
| 10,019,990 B2* | 7/2018 | Li | G10L 19/24 |
| 2002/0103639 A1 | 8/2002 | Chang et al. | |
| 2004/0088272 A1 | 5/2004 | Jojic et al. | |
| 2005/0159949 A1 | 7/2005 | Yu et al. | |
| 2010/0036660 A1* | 2/2010 | Bennett | G10L 17/26 |
| | | | 704/231 |
| 2013/0035933 A1* | 2/2013 | Hirohata | G10L 15/20 |
| | | | 704/206 |
| 2014/0114655 A1* | 4/2014 | Kalinli-Akbacak | G10L 25/63 |
| | | | 704/231 |

OTHER PUBLICATIONS

Pinkowshi, Ben.: "Principal Component Analysis of Speech Spectrogram Images", Pergamon—Pattern Recognition, vol. 30, No. 5, pp. 777-787, 1997 Pattern Recognition Society, Published by Elsevier Science Ltd.

International Preliminary Report on Patentability dated Dec. 18, 2018 From the International Bureau of WIPO Re. Application No. PCT/IL2017/050648. (6 Pages).

International Search Report and the Written Opinion dated Jul. 11, 2017 From the International Searching Authority Re. Application No. PCT/IL2017/050648. (10 Pages).

Invitation Pursuant to Rule 62a(1) EPC dated Jan. 17, 2020 From the European Patent Office Re. Application No. 17812878.1. (4 Pages).

Office Action dated Jun. 15, 2020 From the Israel Patent Office Re. Application No. 263655. (3 Pages).

Supplementary European Search Report and the European Search Opinion dated Dec. 2, 2020 From the European Patent Office Re. Application No. 17812878.1. (13 Pages).

Pinkowski "Principal Component Analysis of Speech Spectrogram Images", Pattern Recognition, XP004059147,30(5): 777-787, May 1997.

\* cited by examiner

AUTOMATIC SPEECH RECOGNITION

CROSS-REFERENCE TO RELATED APPLICATIONS

The present application is a National Phase filing under 35 U.S.C. § 371 of International Patent Application No. PCT/IL2017/050648, filed Jun. 11, 2017, which is based upon and claims the benefit of the priority date of U.S. Provisional Patent Application Ser. No. 62/349,676, filed Jun. 14, 2016, each of which is expressly incorporated herein by reference in its entirety.

TECHNICAL FIELD

The present invention relates to inter-disciplinary sub-field of computational linguistics, incorporating: linguistics, computer science and electrical engineering. More particularly, the present invention relates to development of methodologies and technologies for recognition and translation of spoken language into text and classification of spoken language.

BACKGROUND

Automatic Speech recognition (ASR) also known as "computer speech recognition" (CSR) or "speech to text" (STT). In essence, speech recognition is a computerized process of converting speech signals to a sequence of word or other linguistic units into a written form.

In contrast to ASR, the term voice recognition or speaker identification refers to identifying a speaker, rather than what was spoken. Voice recognition systems are used to authenticate or verify the identity of a speaker as part of a security process. However, identifying a speaker simplifies speech recognition task of systems that have been trained on a specific voice. Some ASR systems use "training" where an individual speaker record text into the system. The ASR analyzes the individual specific voice and utilizes it for fine-tuning the recognition of that individual speech, resulting in increased accuracy. Such ASR systems are categorized as speaker dependent system, in contrast to speaker independent systems, that do not use training.

ASR applications typically replace manual control input in fields, such as car systems; document processing, therapeutic, military, and training, telephony, gaming, education, supporting disabled people. For example by means of a finger control on the steering-wheel, enables the speech recognition system and this is signaled to the driver by an audio prompt. Following the audio prompt, the system has a "listening window" during which it may accept a speech input for recognition. Speech recognition can be implemented in front-end or back-end of documentation process. Front-end speech recognition is where the provider dictates into a speech-recognition engine, the recognized words are displayed as they are spoken, and the dictator is responsible for editing and signing off on the document. Prolonged use of speech recognition software in conjunction with word processors has shown benefits to short-term-memory re-strengthening in brain AVM patients. ASR systems have been operated successfully in fighter aircraft, with applications including: setting radio frequencies, commanding an autopilot system, setting steer-point coordinates and weapons release parameters, and controlling flight display. ASR in the telephony, computer gaming and simulation is now commonplace. Speech recognition can be useful for learning, particularly in language learning. It can help teach proper pronunciation, in addition to helping a person develop fluency with their speaking skills. For hearing impaired individuals, speech recognition software is used to automatically generate a closed-captioning of conversations such as discussions in conference rooms, classroom lectures, and/or religious services.

Unlike the traditional methods of inputs (e.g. pressing buttons or interacting with a computer screen), speech recognition (i.e. speaking to a device) has some challenges. Despite the last decade progress in the field of speech recognition, commercially available ASR outcomes have uncertainties associated with the reliability of the input speech signal, and the fact ASR systems inherently returns probabilities, not certainties. It is the objective of this disclosed subject matter to introduce remedies to the above mentioned uncertainties.

SUMMARY OF THE INVENTION

According to a first aspect of the present invention, a method of speech recognition, sequentially executed, by a processor, on a plurality of consecutive speech segments, the method comprising: obtaining digital information of a speech segment, wherein the digital information comprising a spectrogram representation; extracting a plurality of speech features characterizing the segment from the spectrogram representation; determining a consistent structure segment vector based on the speech features; deploying machine learning to determine at least one label of the segment vector; and outputting the at least one label.

In some exemplary embodiments, the obtaining digital information further comprising digitizing, by a processor, an analog voice signal originating from a device selected from a group comprising of: a real time sound sensor; and a sound storage device; wherein, the analog sound signal comprising analog voice portions and non-voice portions; and wherein the digitizing of the analog voice portion produces the digital information of a segment.

In some exemplary embodiments, the segment represents speech elements selected from a group comprising of: a syllable; a plurality of syllables; a word; a fraction of a word; a plurality of words; and a combination thereof.

In some exemplary embodiments, the extracting a plurality of speech features further comprises assembling a plurality of matrixes and an index matrix, having identical number of cells, wherein each matrix of the plurality of matrixes represents a different speech feature of the plurality of speech features, wherein assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a speech feature value of a time frame and a frequency band indicated by the index matrix.

In some exemplary embodiments, one or more portions of frequency bands of the index matrix falling below a threshold of minimum number of consecutive time frames are filtered out of the index matrix and the plurality of matrixes In some exemplary embodiments, contiguous time frames containing similar speech features values are replaced with a time interval in the index matrix and the plurality of matrixes.

In some exemplary embodiments, the determining a consistent structure segment vector further comprises compiling a plurality of components each comprising equal number of operands, wherein the first component of the plurality of components is an index component corresponding with the index matrix while the rest of the plurality of components are features components corresponding with the features matrixes, wherein a total number of operands is all possible combinations of frequency bands pairs (pairs), and wherein the index component indicate operands having pairs presence in the segment vector.

In some exemplary embodiments, the segment vector further comprises inner relations that carry extra information necessary for the speech recognition.

In some exemplary embodiments, properties of operands, having pairs presence, of each feature component are determined by calculating cross effect between sets of aggregated pairs, wherein each set of aggregated pairs is associated with a predetermined time zone of the speech segment.

In some exemplary embodiments, deploying machine learning further comprises classifying a segment vector based on preceding segment vectors and their labels, wherein each vector has at least one label comprising at least one alphanumeric character manifestation of a voice segment.

According to another aspect of the present invention, a method of voice recognition, sequentially executed, by a processor, on a plurality of consecutive voice segments, the method comprising: obtaining digital information of a voice segment, wherein the digital information comprising a spectrogram representation; extracting a plurality of voice features characterizing the segment from the spectrogram representation; determining a consistent structure segment vector based on the voice features; deploying machine learning to determine at least one label of the segment vector; and outputting the at least one label.

In some exemplary embodiments, the obtaining digital information further comprising digitizing, by a processor, an analog sound signal originating from a device selected from a group comprising of: a real time sound sensor; and a sound storage device; wherein, the analog sound signal comprising analog voice portions and non-voice portions; and wherein the digitizing of the analog voice portion produces the digital information of a segment.

In some exemplary embodiments, the segment represents voice elements selected from a group comprising of: a syllable; a plurality of syllables; a word; a fraction of a word; a plurality of words; and a combination thereof.

In some exemplary embodiments, the extracting a plurality of voice features further comprises assembling a plurality of matrixes and an index matrix, having identical number of cells, wherein each matrix of the plurality of matrixes represents a different voice feature of the plurality of voice features, wherein assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a voice feature value of a time frame and a frequency band indicated by the index matrix.

In some exemplary embodiments, one or more portions of frequency bands of the index matrix that fall below a threshold of minimum number of consecutive time frames are filtered out of the index matrix and the plurality of matrixes.

In some exemplary embodiments, contiguous time frames containing similar voice features values are replaced with a time interval in the index matrix and the plurality of matrixes.

In some exemplary embodiments, the determining a consistent structure segment vector further comprises compiling a plurality of components each comprising equal number of operands, wherein the first component of the plurality of components is an index component corresponding with the index matrix while the rest of the plurality of components are features components corresponding with the features matrixes, wherein a total number of operands is all possible combinations of frequency bands pairs (pairs), and wherein the index component indicate operands having pairs presence in the segment vector.

In some exemplary embodiments, properties of operands, having pairs presence, of each feature component are determined by calculating cross effect between sets of aggregated pairs, wherein each set of aggregated pairs is associated with a predetermined time zone of the voice segment.

In some exemplary embodiments, deploying machine learning further comprises classifying a segment vector based on preceding segment vectors and their labels, wherein each vector has at least one label comprising at least one alphanumeric character manifestation of a voice segment.

According to yet another aspect of the present invention, a method of image recognition, executed, by a processor, on a plurality of image segments, wherein an image segment represents a portion of a region of interest (ROI) of an image, the method comprising: obtaining digital information of an image, extracting a plurality of image features characterizing the segment from the digital information of an image; determining a consistent structure segment vector based on the image features; deploying machine learning to determine at least one label of the segment vector; and outputting the at least one label.

According to yet another aspect of the present invention, a system configured to execute speech, voice and image recognition, the system comprising: at least one client device configured to obtain and display information; a segment vector generator configured to determining a consistent structure segment vector based on features selected from the group comprising of: speech features; voice features and image features; and a machine learning server configured to determine at least one label of the segment vector.

In some exemplary embodiments, the at least one client device is further configured to obtain the information from devices selected from the group comprising of: image capturing; video capturing; images storage; video storage; a real time sound sensor; and a sound storage.

In some exemplary embodiments, the at least one client device is further configured to perform activities selected from the group comprising of: displaying a visual representation of labels; receiving commands from a user; and transmitting commands and information over the internet.

In some exemplary embodiments, the segment vector generator is further configured to receive digital information from at least one client device over the internet In some exemplary embodiments, the segment vector generator is further configured to execute activities selected from the group comprising of: generating spectrogram representation; extracting a plurality of features from the spectrogram representation.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
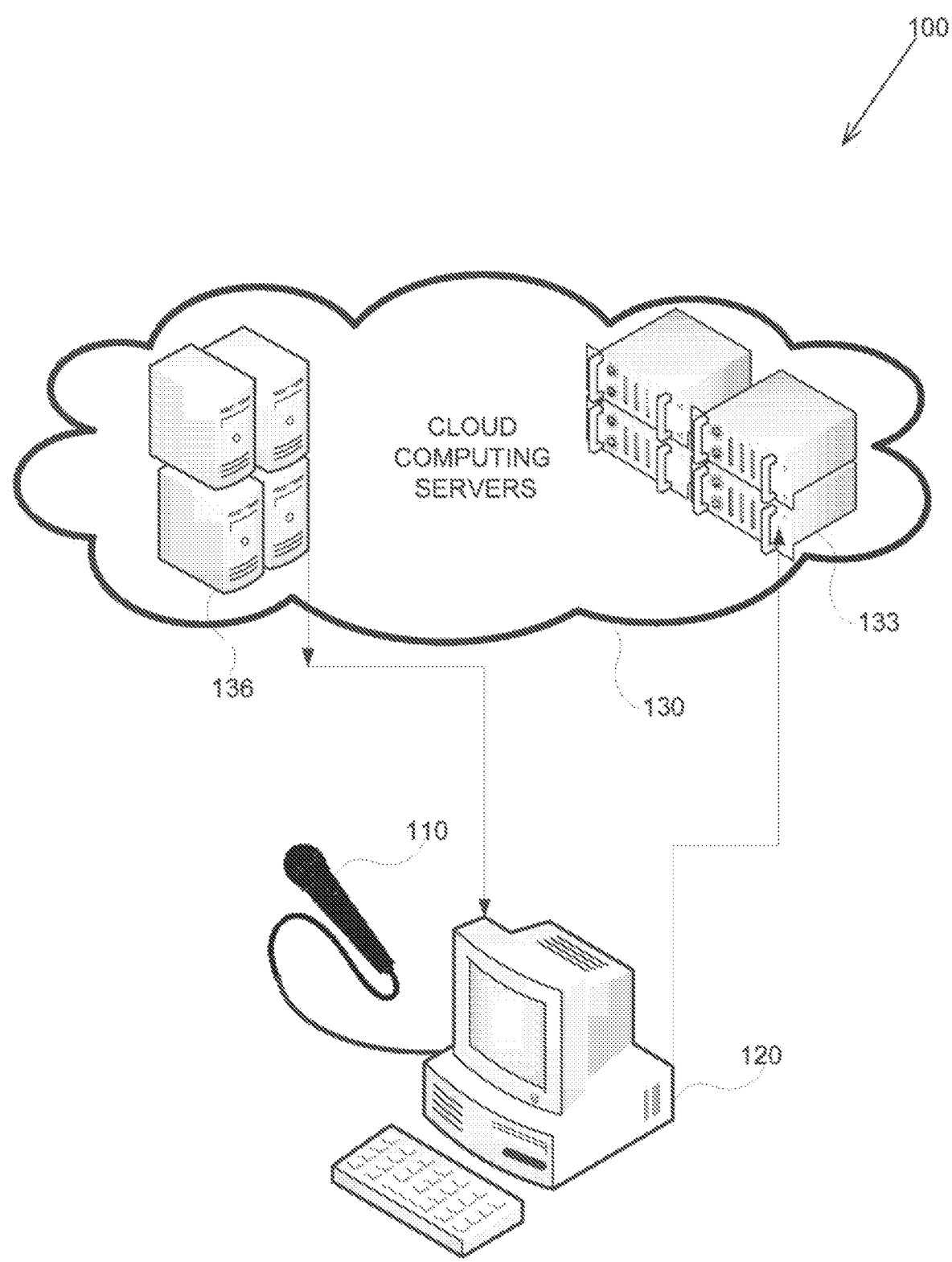
FIG. 1 shows an automatic speech recognition system in accordance with some exemplary embodiments of the disclosed subject matter.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings. It should be noted that the following terms, appearing throughout this disclosed subject matter, are used as terms of convenience. These terms, as defined below, are used for teaching purposes only, and are not intended to limit the scope of the invention.

Referring now to FIG. 1 showing automatic speech recognition (ASR) system 100 in accordance with some exemplary embodiments of the disclosed subject matter.

Figure 2:
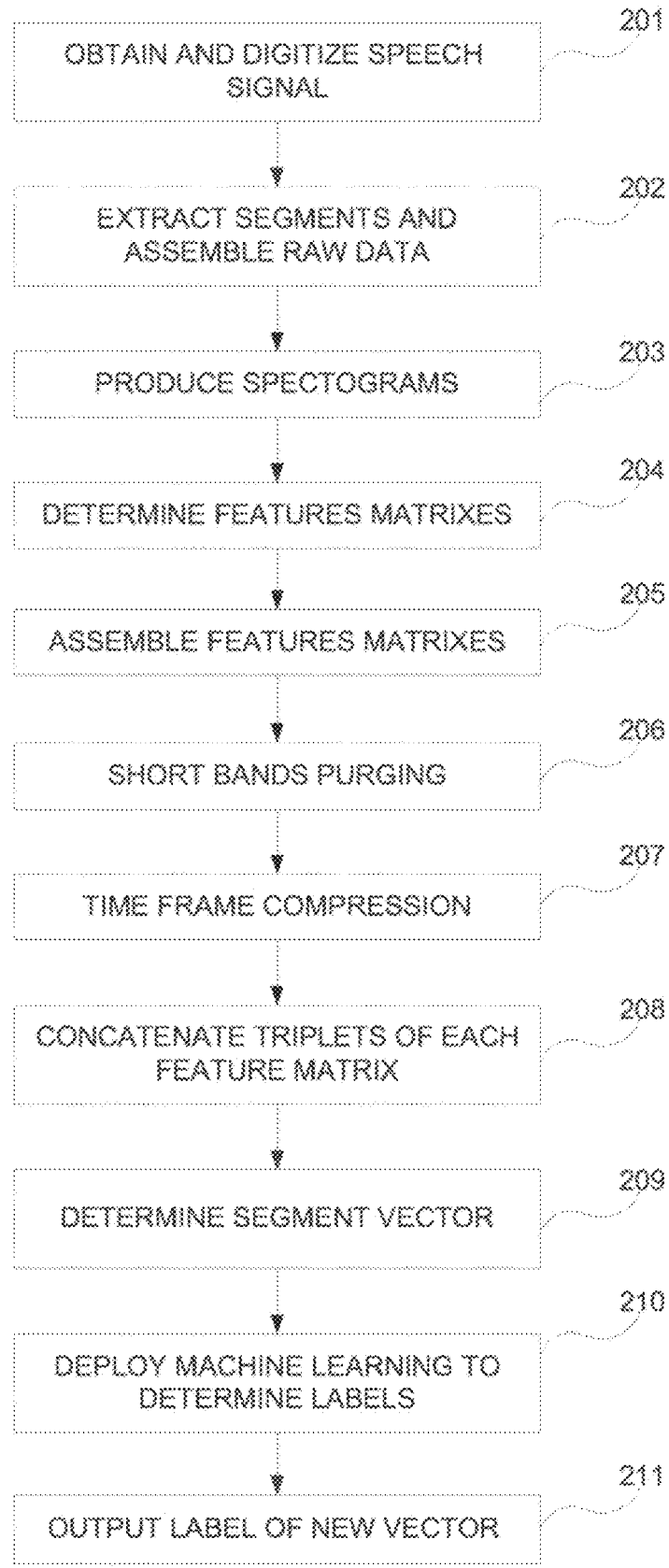
FIG. 2 shows a flowchart diagram of a method of automatic speech recognition, in accordance with some exemplary embodiments of the disclosed subject matter.

ASR system 100 may be based on a cloud computing server (CCS) 130 deployed in a remote location and may comprise a collection of processing devices and services, such as the Amazon AWS cloud-computing platform. In some exemplary embodiments, CCS 130 incorporates machine learning server 136 and segment vector generator 133, both adapted to perform methods such as depicted in FIG. 2. Wherein, the methods comprising: sequentially executing a plurality of consecutive speech segments, voice segments, image, a combination thereof, or the like. System 100 may be farther configured to support and communicate, over the internet, with a plurality of clients such as client 120.

In some exemplary embodiments, client (device) 120 may be a computer, a smartphone, a laptop computer, a tablet PC, or the like. Additionally or alternatively, client 120 may be a special purpose device comprising a central processing unit (CPU) (not shown). The CPU may be a microprocessor, an electronic circuit, an integrated circuit, implemented as special firmware ported to a specific device such as a digital signal processor, an application specific integrated circuit, or the like. In some exemplary embodiments, client 120 may be utilized to perform computations required by the system 100 or any of it subcomponents. Additionally or alternatively, client 120 may be utilized, by a user (not shown), for initiating tasks associated with speech recognition.

In some exemplary embodiments of the disclosed subject matter, client 120 may comprise an input/output (I/O) module (not shown). In addition to the typical roles of an I/O module in a commercially available computer, the I/O module, of the disclosed subject matter, may comprise an analog to digital converter (ADC) (not shown) capable of digitizing speech signals. In some exemplary embodiments, the I/O module of client 120 interfaces with an external microphone, such as microphone 110; an internal microphone, such as a built-in microphone in a smartphone; an analog speech recorder; a combination thereof, or the like. The outcome of digitizing analog speech signal may be retained in segment vector generator 133 where it will be processed into a segment vector prior to transmitting it to machine learning server 136 for initiating a speech recognition process.

Referring now to FIG. 2 showing a flowchart diagram of a method of automatic speech recognition, in accordance with some exemplary embodiments of the disclosed subject matter.

In Step 201, a speech signal may be obtained and digitized. In some exemplary embodiments of the disclosed subject matter, human speech may be represented by an analog speech signal that varies over time. Wherein, the (voltage) amplitude of the signal is analogues to acoustic intensity (loudness), and the shape of the wave represents frequency (pitch). The speech signal may be obtained in real-time directly from a microphone, sound amplifier, or the like. In some exemplary embodiments, the analog speech signal may be obtained from a device retaining analog speech recordings, such as audio/video cassettes LP records a combination thereof, or the like. In order for the ASR system to analyze properties of a speech signal, the signal (i.e. the ASR raw data) may be converted into a set of discrete values, using a process called digitization.

Figure 3:
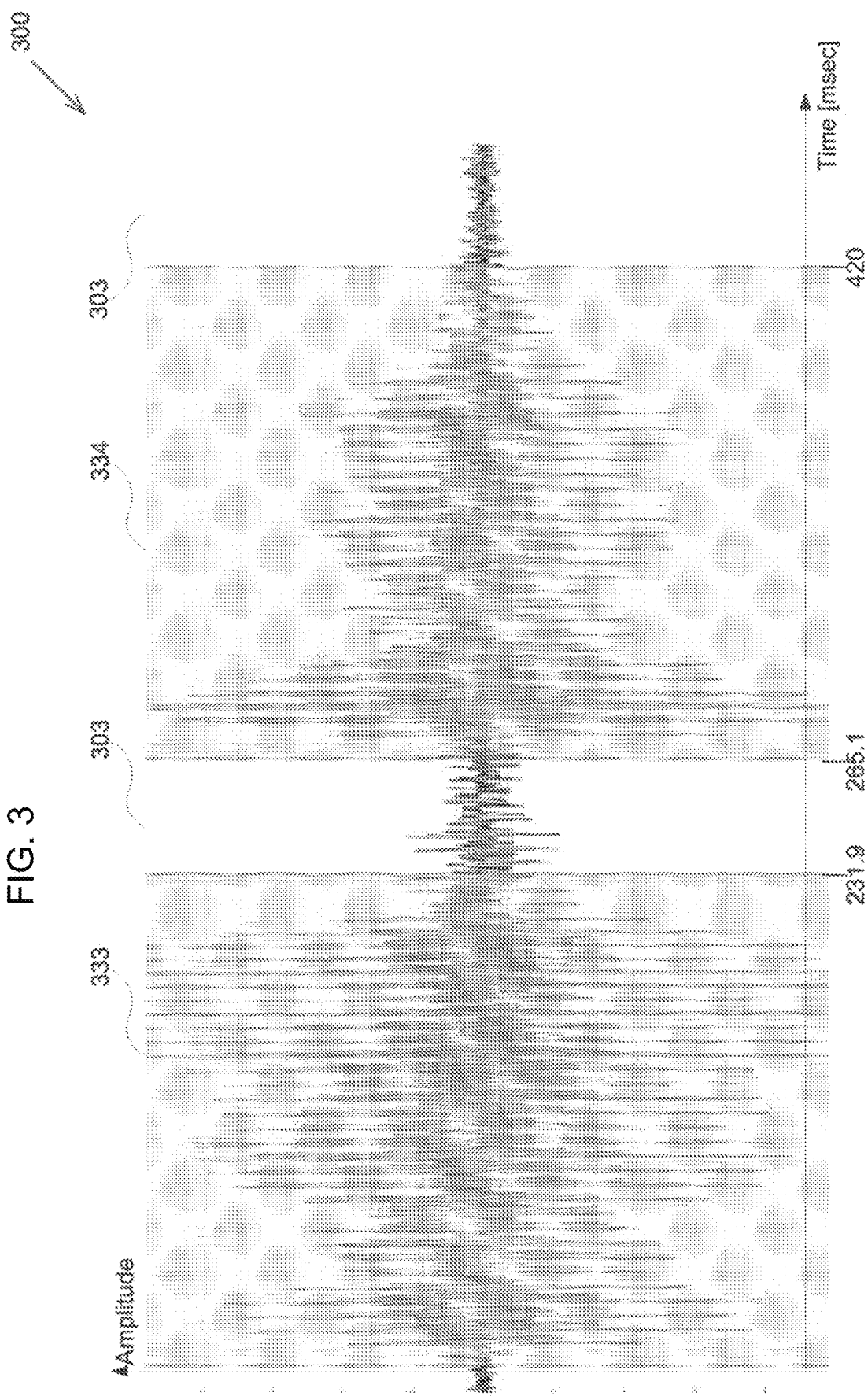
FIG. 3 shows an analog representation of a speech signal, in accordance with some exemplary embodiments of the disclosed subject matter.

Referring now to FIG. 3 showing an analog representation of speech signal, in accordance with some exemplary embodiments of the disclosed subject matter. In some exemplary embodiments, the ADC, of FIG. 1, samples the value of analog speech signal 300 repeatedly and encodes each result in a set of bits that forms speech information. Prior to this digitizing process, the I/O Module, of FIG. 1, filters the signal with low pass filter (LPF) having a cutoff frequency of 8 KHz. It should be noted that while humans can hear frequencies as high as 20 kHz, most of the information conveyed in speech does not exceed 8 kHz. Once the analog speech signal 300 is digitized, client 120 of FIG. 1 can store the speech information, as well as transmitting the speech information across the Internet, including segment vector generator 133. Based on Nyquist's theorem, the sampling frequency may be at least twice as high as the highest input frequency. Thus, the voice signal may be sampled at 16 KHz so that frequencies up to 8 KHz can be recorded every 62.5 μsec. By sampling this often, according to Nyquist, the result will be a faithful representation of the original signal.

By analyzing the representation of analog speech signal 300, client 120 of FIG. 1 may be configured to distinguish between segments of the speech signal 300, wherein speech segment (SS) 333 and SS334 (representing the words ELIAV and DANIELLE respectively) are examples of a speech segment. While segments 303 are an example of silence segment. In some exemplary embodiments, SS303 is attributed to speaking pause, end of speech, silence, or the like due to lack of speech signal or a substantially low speech signal amplitude. In some exemplary embodiments, speech segments (SS), such as SS333 & SS334 may comprise one or more syllables that make-up a word. However, in cases of spontaneous and fast speech, pauses (such as SS303) between words may be swallowed and therefore undetected. In some exemplary embodiments, the segment represents speech elements selected from a group comprising of: a syllable; a plurality of syllables; a word; a fraction of a word; a plurality of words; and a combination thereof. It should be understood that in some exemplary embodiments, the issue of undetected SS303s is disregarded, in this step of the speech recognition method, and thus treating connected syllables as a SS's.

Additionally or alternatively, speech information (i.e. digitized speech signal) comprising a plurality SS's may be retained in client 120 and/or transmitted to segment vector generator 133 for speech recognition process.

Referring back to FIG. 2.

In Step 202, segments may be extracted and assembled into a raw data repository (not shown). In some exemplary embodiments, each segment, such as SS333, of the plurality of segments comprising the speech information may be extracted and assembled in the raw data repository.

It should be noted that in the present disclosed subject matter the term "speech information" refers to a string of digital information accumulated from digitizing the analog speech signal.

It should also be noted that in the present disclosed subject matter the term "raw data" refers to the outcome of manipulating and assembling the speech information (as described below in FIG. 4) into the raw data repository.

Figure 4:
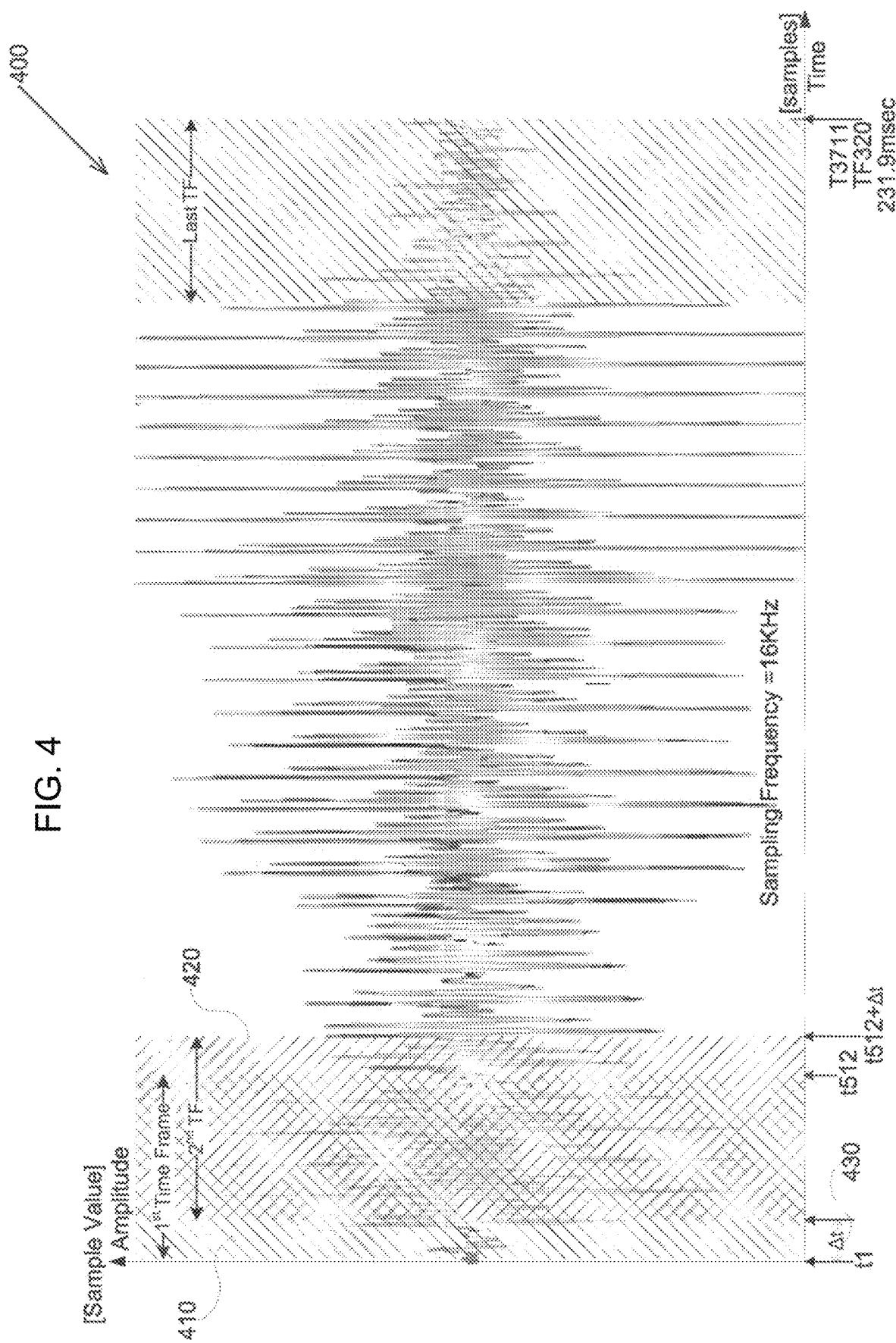
FIG. 4 illustrates a visual representation of a segment of speech information, in accordance with some exemplary embodiments of the disclosed subject matter.

Referring now to FIG. 4 illustrates a visual representation of a segment 400 of the speech information, in accordance with some exemplary embodiments of the disclosed subject matter.

The visual representation of a segment, depicted in FIG. 4, shouldn't be mistaken for an analog signal despite its look. In fact, the segment of the speech information is a string of digital values, wherein the values represent amplitude and the order in which the values are arranged correlates to the sampling order in the time domain. And therefore FIG. 4 is shown as such for illustration purposes only.

In some exemplary embodiments of the disclosed subject matter, an extracted segment 400 has time duration of T=231.9 msec. Since it was sampled at a rate of f=16 KHz then the total number of samples (values) in this embodiment will be T*f=3711. In some exemplary embodiments, $1^{st}$ time frame (TF) 410 may comprise 512 samples as well as $2^{nd}$ TF420, $3^{rd}$ TF (not shown) and so on until the last TF of the segment. It should be noted that $1^{st}$ TF410 comprises the first 512 samples, t1 trough t512; while the following TF (i.e. $2^{nd}$ TF420) comprises samples Δt trough t512+Δt; likewise the following TF (not shown) comprises samples 2Δt trough t512+2Δ and so on. As an example if Δt is equal to 10 then the total number of the time frames in this exemplary embodiments, would be 320 which is the greatest integer less than or equal to (3711−512)/10+1.

Referring back to FIG. 2. Step 202. It should be noted that, from analyzing the above (FIG. 4) exemplary embodiments, the initial amount of data samples, in one segment, is stretched from 3,711 to 320×512=163,840 in one segment, resulting from manipulating and assembling the speech information into the raw data repository.

In Step 203, a spectrogram of a segment may be produced. In some exemplary embodiments, a short-time-Fourier-transform (STFT) may be conducted on at least one speech segment, such as SS333 of FIG. 3, of the raw data in order to produce a spectrogram. It should be noted that in essence the resulting spectrogram consists of a collection of Fourier transforms of all the TF of the segment. The Fourier transforms may be used to determine base frequency, harmonic frequencies, spectral magnitude and phase content of each time frame.

Figure 5:
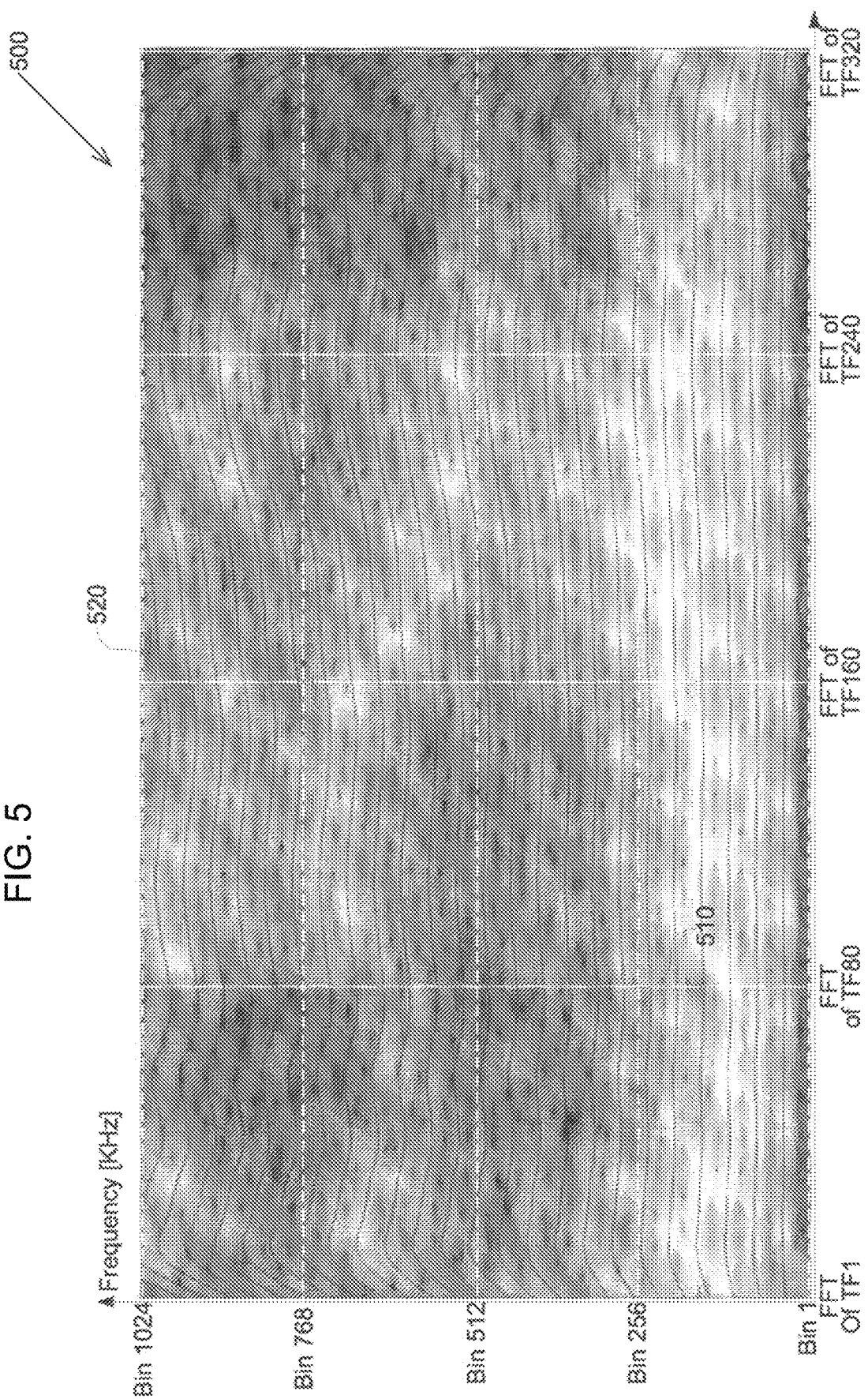
FIG. 5 shows a visual representation of a spectrogram, in accordance with some exemplary embodiments of the disclosed subject matter.

Referring now to FIG. 5 showing a visual representation of spectrogram 500, in accordance with some exemplary embodiments of the disclosed subject matter.

In some exemplary embodiments, spectrogram 500 may be based on 320 time frames wherein each TF comprises 1024 bins, each of which related to a specific frequency. The intensity of one element, for example element 510 (Bin 256, TF80), corresponds to the spectral magnitude of TF80 at Bin (frequency) 256. The intensity along vertical line 520 represents the spectral distribution of TF160. It should be appreciated that the bright areas (high intensity) of FIG. 5 correspond to frequency regions that are being enhanced due to their proximity to resonance frequencies, known as "Formants", originating from the shape of the vocal tract. While the dark areas (low intensity) corresponding to attenuated frequency, distant from the resonance frequencies. The information required for distinguishing between speech sounds can be represented by specifying formants and base frequency, both extracted from the spectrogram. Additionally or alternatively, the disclosed subject matter utilizes the spectrogram for calculating base frequencies and its harmonies for each time frame. It should be noted that in the present disclosure the term "harmony" refers to frequencies that are a product of the base frequency multiplication by integer.

Referring back to FIG. 2.

In Step 204, features matrixes of a segment may be generated. In some exemplary embodiments, a spectrogram, such as spectrogram 500 may be the basis for generating features matrixes of a segment. The features matrixes may be index matrix, means matrix, standard deviations matrix, maximum matrix, voiced-unvoiced matrix, or the like. In some exemplary embodiments, the base frequency and the harmonies of each time frame may be determined.

Figure 6:
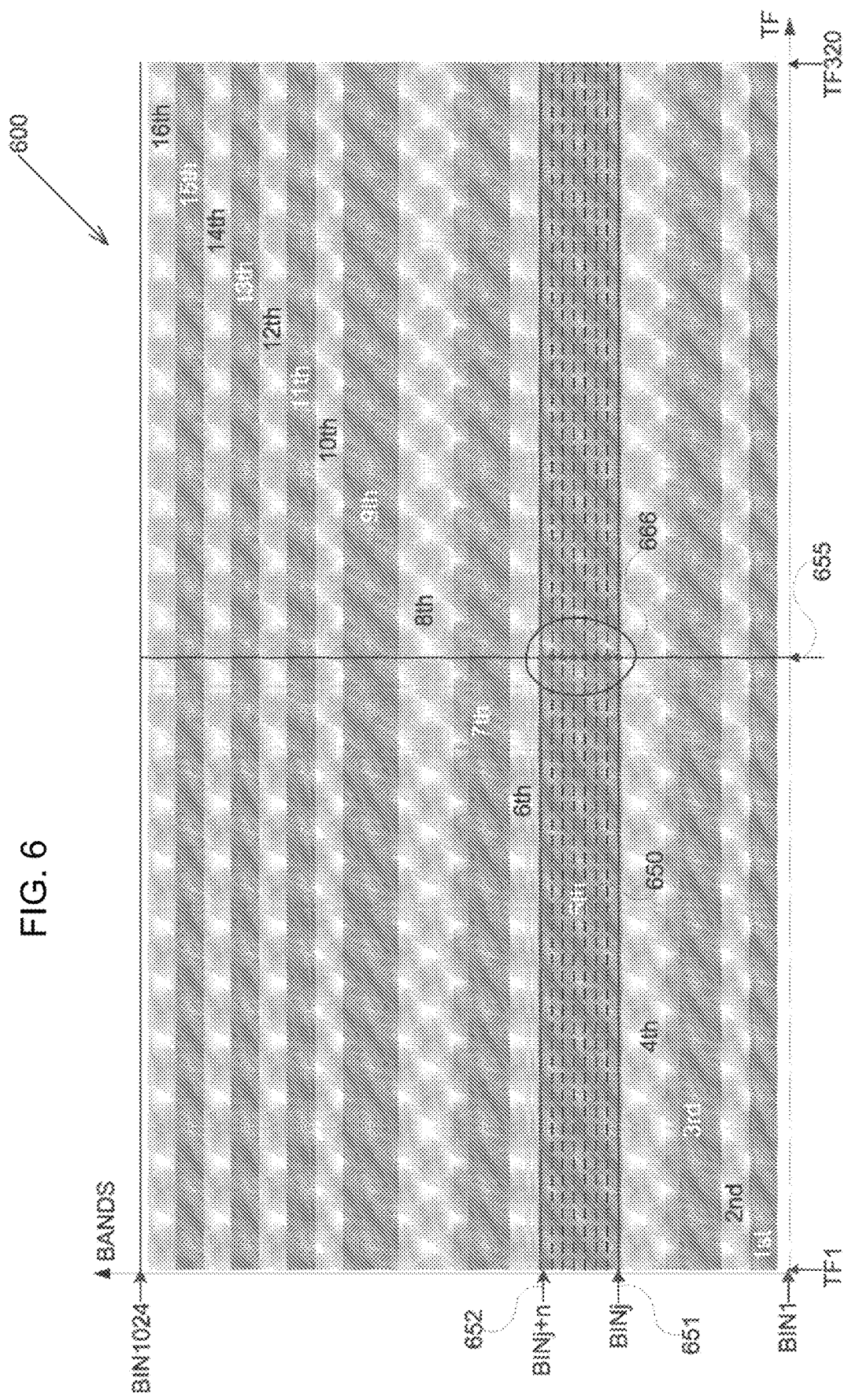
FIG. 6 shows a visual representation of a plurality of bands, in accordance with some exemplary embodiments of the disclosed subject matter.

Referring now to FIG. 6 showing a visual representation of a plurality of bands 600, in accordance with some exemplary embodiments of the disclosed subject matter.

In some exemplary embodiments, the plurality of bands 600 may comprise 16 bands of bins selected out of a spectrogram, such as spectrogram 500 of FIG. 5. Each band out of the 16 bands may comprise a plurality of bins, as an example 5th band 650 comprises sequential bins between binj 651 trough binj+n 652. Wherein subscripts j and j+n indicate bin numbers, thus, 5th band 650 of the example comprises (n+1) bins.

The following should be noted:
Each band may comprise at least one bin.
The bins of each band are adjacent bins.
The number of bins in a band may vary from one band to another.
In some exemplary embodiments, certain bins are excluded from all bands.
In some exemplary embodiments, one or more bins may be included in two adjacent bands.

In some exemplary embodiments, the amount of bins of each band is constant along the time frame domain.

In some exemplary embodiments, each TF, such as TF655, may have a cluster, such as cluster 666, of values for each band. Thus the spectrogram may be transformed into a matrix of n {TF} by m {bands} clusters. Following the example of 320 time frames and 16 bands will yield to 16×320 clusters matrix. In some exemplary embodiments of the disclosed subject matter, the mathematical operation performed on the values of the clusters determines the essence of a feature. In some exemplary embodiments, calculating the magnitude means of the values of each cluster of the matrix will result in generating a 320×16 magnitude means feature matrix. The same method applied for generating: magnitude standard deviations feature matrix; magnitude maximum values feature matrix; magnitude voice-unvoiced ratio feature matrix; a combination thereof, or the like. It should be noted that the voice-unvoiced ratio may be defined as the ratio between the total magnitudes values of at least two groups of bins in a cluster, such as cluster 666. In some exemplary embodiments, a first group may be: a group of bins that comprises harmonies; a second group of bins that doesn't comprise harmonies; or the like. Thus the ratio between the first group and the second group may indicate a presence and absence of a voiced sound within a cluster (i.e. a given time frame and a given band)

It should be also noted that all matrixes are based on time frames and frequency bands, whereas the index matrix dictates the relevant bands. Wherein, assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a speech feature value of a time frame and a frequency band indicated by the index matrix.

The following table is an example of four features matrixes, showing 3 out of 320 time frames, taken from testing a segment representing the word "ELIAV". It should be understood that the values of each matrix cell is an outcome of a mathematical operation performed on a corresponding, band and TF, cluster.

TABLE #1

| Band Index | Means | | | Standard Deviations | | | Maximum Values | | | Voice-Unvoiced Ratio | | |
|---|---|---|---|---|---|---|---|---|---|---|---|---|
| | TF298 | TF299 | TF300 | TF298 | TF299 | TF300 | TF298 | TF299 | TF300 | TF298 | TF299 | TF300 |
| 1 | 1.59 | 0 | −1.58 | 1.2 | 1.11 | 1.06 | −3.22 | −3.21 | −3.2 | 0.9 | 0.88 | 0.69 |
| 2 | −1.59 | −1.54 | −1.50 | 1.34 | 1.2 | 1.09 | −3.38 | −3.34 | −3.31 | 2.35 | 1.71 | 1.74 |
| 3 | 0.9B | −1.00 | −1.01 | 1.38 | 1.2 | 1.02 | −1.72 | −1.79 | −1.86 | 1.32 | 1.11 | 0.97 |
| 4 | 0.05 | 0.01 | 0.04 | 1.59 | 1.53 | 1.66 | 0.69 | 0.80 | 0.91 | 1.41 | 1.45 | 1.43 |
| 5 | 0.24 | 0.21 | 0.18 | 1.34 | 1.36 | 1.43 | 0.45 | 0.55 | 0.64 | 0.74 | 0.73 | 0.75 |
| 6 | 0.61 | 0.64 | 0.63 | 1.15 | 1.27 | 1.46 | 0.60 | 1.66 | 0.74 | 1.31 | 1.31 | 1.02 |
| 7 | 0.49 | 0.49 | 0.43 | 1.60 | 1.7 | 1.87 | 0.24 | 1.2 | 0.17 | 1.33 | 1.97 | 2.10 |
| 8 | 0.32 | 0.34 | 0.36 | 1.35 | 1.34 | 1.25 | 0.91 | 2.94 | 1.96 | 1.53 | 1.51 | 1.23 |
| 9 | 0.76 | 0.78 | 0.31 | 1.60 | 1.65 | 1.49 | 2.76 | 2.35 | 2.93 | 4 | 3.88 | 2.12 |
| 10 | 0.28 | 0.30 | 0.32 | 1.30 | 1.30 | 1.27 | 1.04 | 1.06 | 1.09 | 4.4 | 4.05 | 3.92 |
| 11 | 0.98 | 1.00 | 1.02 | 1.86 | 1.96 | 1.98 | 4.72 | 4.77 | 4.31 | 5.23 | 5.27 | 6.12 |
| 12 | 1.08 | 1.07 | 1.07 | 1.98 | 1.77 | 1.64 | 4.63 | 4.72 | 4.75 | 0.47 | 0.49 | 0.50 |
| 13 | 1 | 1.01 | 1.01 | 1.49 | 1.47 | 1.51 | 3.11 | 3.18 | 3.24 | 2.62 | 3.63 | 4.02 |
| 14 | 0.18 | 0.2 | 0.22 | 1.67 | 1.7 | 1.62 | 2.07 | 2.1 | 2.12 | 7.57 | 6.01 | 6.29 |
| 15 | 0.86 | 0.87 | 0.89 | 1.73 | 1.73 | 1.7 | 3.51 | 3.53 | 3.54 | 6.29 | 6.47 | 6.39 |
| 16 | 2.4 | 2.41 | 241 | 2.55 | 2.61 | 2.52 | 7.1 | 7.09 | 7.06 | 0.59 | 0.68 | 0.79 |

Figure 7:
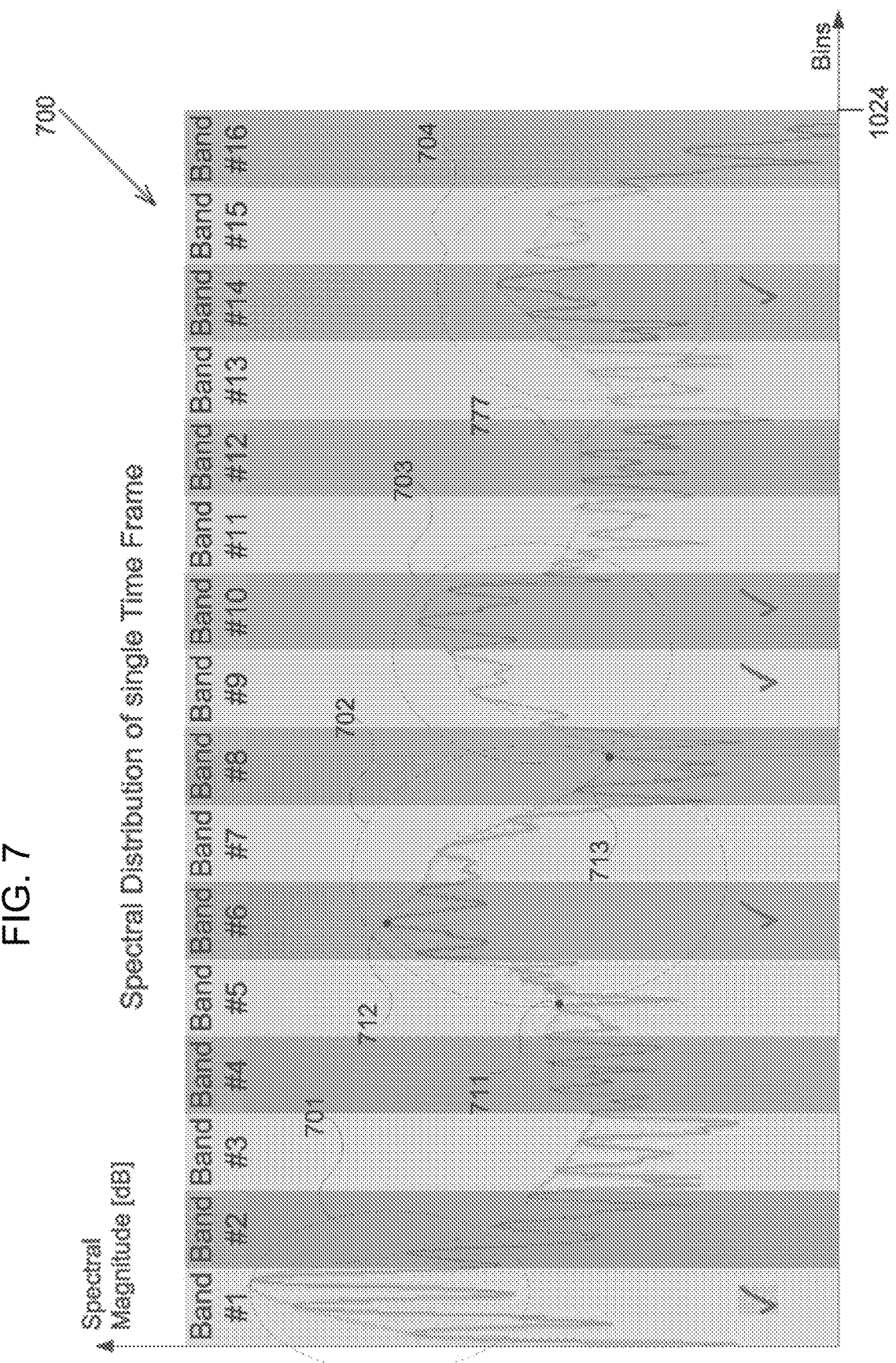
FIG. 7 depicts a spectral distribution of one time frame, in accordance with some exemplary embodiments of the disclosed subject matter.

Referring now to FIG. 7 depicting a spectral distribution of one time frame SDTF 700, in accordance with some exemplary embodiments of the disclosed subject matter.

It should be noted that the visual representation of SDTF 700, shouldn't be mistaken for an analog signal despite its look. SDTF 700 represents a single Fourier transform of a given TF of a spectrogram, such as spectrogram 500. SDTF 700 may be visualized as single vertical line (i.e. time frame) of the spectrogram, comprising one value for each one of the 1024 bins. The current form of visual representation (FIG. 7) is presented as such for ease of referencing. It should be also noted that the band width of the 16 bands doesn't have to be equal as depicted in FIG. 7.

In some exemplary embodiments, a maxima spectral envelop 777 of SDTF 700 is a boundary curve that traces the local maximum magnitudes along the frequency domain. Practically outlining the local maxima of the spectral distribution in a single time frame. In some exemplary embodiments, SDTF 700 may comprise a plurality of surges such as surge 701, surge 702, surge 703, surge 704, or the like. It should be noted that a surge, such as for example surge 702, may be characterized by leading edge (LE) 711, trailing edge (TE) 713, and peak 712. Wherein, leading edge 711, trailing edge 713 defines the surge boundaries and peak 712 defines the highest magnitude within the surge boundaries.

Referring back to FIG. 2.

In some exemplary embodiments, step 204, (i.e. the process of generating features matrixes) may further comprise determining a number (n) of bands, wherein 1≤n≤16, that best characterize the spectral distribution of each TF. It should be noted that these bands represent the formants' characteristics. The determination, of the n bands that best characterizes the spectral distribution, may be based on local maxima and minima of the maxima spectral envelop 777, in short, spectral envelop. In other words, identifying the n bands attributed to the maxima and n bands attributed to the minima of the spectral envelop. In some exemplary embodiments, the bands that are not identified as best characterizing the spectral envelop may be discarded. As an example, if bands 2, 4, 6, 8 and 13 were identified as best characterizing bands, then the rest of the 11 bands may be discarded. In the present disclosure the process of determining the relevant bands of the index matrix is denoted as "bands filtering".

Additionally or alternatively, the mathematical operation performed on the values of the clusters for calculating the values of each feature matrix, as described in FIG. 6 above, may be performed after bands filtering.

In order to identify the n maxima bands (i.e. the bands that best characterize the maxima) of spectral distribution, significant surges may be located along the spectral envelope. A significant surge may be a surge, such as surge 702 of FIG. 7, that the difference between its peak magnitude (i.e. peak 712 of FIG. 7) and each one of its edges (i.e. LE 711, TE 713 of FIG. 7) is greater than a predefined threshold (T). Hence |peak 712−LE 711|>T; and |peak 712−TE713|>T. In some exemplary embodiments, LE 711, TE 713 of FIG. 7 may be enquired from calculating the $1^{st}$ derivative of the spectral envelop function. Following the locating of all significant surges, bands that overlap significant surges may be identified. In one exemplary embodiment, for each significant surge, the band, having the highest magnitude mean, out of a plurality of bands, that may overlap the surge, may be indicated as one of the n maxima bands. In the exemplary embodiment that the number of these maxima bands exceeds the value n, the n bands with the lower frequency may be selected as the maxima bands. In the exemplary embodiment that the number of these maxima bands falls below n, the difference is made up from bands overlapping surges with widest boundaries.

It should be noted that, the process of identifying the n bands that best characterize the minima may be similar to the process of identify the n maxima bands, described in the above paragraph. Additionally or alternatively, Step 204, further comprises producing the means matrix, standard deviations matrix, maximum matrix, voiced-unvoiced matrix, or the like for both (n) maxima bands (MaxB) and (n) minima bands (MinB) of each IT. Wherein (n) indicates the number of bands.

In Step 205, features matrixes of a segment may be assembled in an (n) bands-format, wherein, (n) bands-format can be defined as the number time frames (#TF) by $n_{MaxB}$ followed by #TF by $n_{MinB}$. It should be noted that while #TF may vary from segment to segment, the number (n) of MaxB always equal to the number (n) of MinB. The number (n) is a system preference factor that remains constant, throughout each ASR session. As previously discussed each segment comprises features matrixes, wherein the values of each matrix are indicative of a feature selected from a group comprising mean, standard deviation, maximum values, voice-unvoiced ratio, or the like, yet all matrixes adhere to the format described above.

In some exemplary embodiments of the disclosed subject matter, #TF=320 and n=5, thus the assembly order of a matrix may be 320 by $5_{MaxB}$ followed by 320 by $5_{MinB}$, as illustrated in table 2 below.

TABLE # 2

|  |  | ... TF9 | TF10 | TF11 ... TF99 | TF100 | TF101 ... TF318 | TF319 | TF320 |
|---|---|---|---|---|---|---|---|---|
| Maxima Bands | 1st | ... 2 | 1 | 3 ... 1 | 3 | 2 ... 2 | 4 | 2 |
|  | 2nd | ... 4 | 2 | 5 ... 3 | 4 | 4 ... 4 | 6 | 4 |
|  | 3rd | ... 6 | 7 | 6 ... 5 | 5 | 6 ... 6 | 8 | 6 |
|  | 4th | ... 8 | 11 | 9 ... 9 | 6 | 8 ... 10 | 10 | 8 |
|  | 5th | ... 15 | 13 | 10 ... 14 | 13 | 13 ... 13 | 12 | 15 |
| Minima Bands | 1st | ... 1 | 3 | 12 ... 7 | 7 | 10 ... 7 | 1 | 9 |
|  | 2nd | ... 3 | 5 | 13 ... 10 | 8 | 11 ... 8 | 2 | 10 |
|  | 3rd | ... 7 | 6 | 14 ... 11 | 9 | 12 ... 9 | 14 | 11 |
|  | 4th | ... 11 | 9 | 15 ... 12 | 10 | 15 ... 12 | 15 | 12 |
|  | 5th | ... 13 | 10 | 16 ... 13 | 11 | 16 ... 14 | 16 | 13 |

It should be understood that the bands are arranged in an ascending order, lower frequency bands first. Furthermore, wherein the values of each cell of the matrix (indicated by a time frame number and a band number) comprises a value attributed to a feature selected from a group comprising mean, standard deviation, maximum values, voice-unvoiced ratio, or the like. It should be noted that all feature matrixes adhere to the same format, such as the format depicted in example matrix #1.

In some exemplary embodiments, features matrixes may be assembled in a triplet bands format. In a triplet bands format, the (n) bands, of the previously described (n) bands format, are grouped in three triplets: first frequency bands triplet ($1^{st}$FB), second frequency bands triplet ($2^{nd}$FB) and third frequency bands triplet ($1^{st}$FB). As an example, where TF9 has 5 bands, formation of 3 triplets may be accomplish by assigning bands 1 to 3 (low frequency bands) to $1^{st}$ FB triplet; bands 2 to 4 (mid frequency bands) to $2^{nd}$FB triplet; and bands 3 to 5 (high frequency bands) to $3^{rd}$ FB triplet; as illustrated in the table below. It should be noted that this formation is applied for both maxima and minima bands.

|  | Maxima Bands |  |  | Maxima Bands | |  |
|---|---|---|---|---|---|---|
| TF9 | $1^{st}$ | 2 | → | $1^{st}$FB | $2^{nd}$FB | $3^{rd}$FB |
|  | $2^{nd}$ | 4 |  | 2 | 4 | 6 |
|  | $3^{rd}$ | 6 |  | 4 | 6 | 8 |
|  | $4^{th}$ | 8 |  | 6 | 8 | 15 |
|  | $5^{th}$ | 15 |  |  |  |  |

|  | Minima Bands |  |  | Minima Bands | |  |
|---|---|---|---|---|---|---|
| TF9 | $1^{st}$ | 1 | → | $1^{st}$FB | $2^{nd}$F | $3^{rd}$FB |
|  | $2^{nd}$ | 3 |  | 1 | 3 | 7 |
|  | $3^{rd}$ | 7 |  | 3 | 7 | 11 |
|  | $4^{th}$ | 11 |  | 7 | 11 | 13 |
|  | $5^{th}$ | 13 |  |  |  |  |

In some exemplary embodiments, the assembly order of a matrix having a triplet bands format may be as follows:
a) (#TF by 1 stFB)MaxB
b) (#TF by 2ndFB)MaxB
c) (#TF by 3rdFB)MaxB
d) (#TF by 1stFB)MinB
e) (#TF by 2ndFB)MinB
f) (#TF by 3rdFB)MinB The following table #3 illustrates an example of an assembling bands index matrixes based on triplets which were derived from a (5) band format index matrix:

TABLE #3

|  |  |  | ...TF9 | TF1 | TF11...TF99 | TF10 | TF101...TF31 | TF31 | TF32 |
|---|---|---|---|---|---|---|---|---|---|
| Maxima Bands | $1^{st}$FB | 1st | ...2 | 1 | 3...1 | 3 | 2...2 | 4 | 2 |
|  |  | 2nd | ...4 | 2 | 5...3 | 4 | 4...4 | 6 | 4 |
|  |  | 3rd | ...6 | 7 | 6...5 | 5 | 6...6 | 8 | 6 |
|  | $2^{nd}$FB | 2nd | ...4 | 2 | 5...3 | 4 | 4...4 | 6 | 4 |
|  |  | 3rd | ...6 | 7 | 6...5 | 5 | 6...6 | 8 | 6 |
|  |  | 4th | ...8 | 11 | 9...9 | 6 | 8...10 | 10 | 8 |
|  | $3^{rd}$FB | 3rd | ...6 | 7 | 6...5 | 5 | 6...6 | 8 | 6 |
|  |  | 4th | ...8 | 11 | 9...9 | 6 | 8...10 | 10 | 8 |
|  |  | 5th | ...15 | 13 | 10...14 | 13 | 13...13 | 12 | 15 |
| Minima Bands | $1^{st}$FB | 1st | ...1 | 3 | 12...7 | 7 | 10...7 | 1 | 9 |
|  |  | 2nd | ...3 | 5 | 13...10 | 8 | 11...8 | 2 | 10 |
|  |  | 3rd | ...7 | 6 | 14...11 | 9 | 12...9 | 14 | 11 |
|  | $2^{nd}$FB | 2nd | ...3 | 5 | 13...10 | 8 | 11...8 | 2 | 10 |
|  |  | 3rd | ...7 | 6 | 14...11 | 9 | 12...9 | 14 | 11 |
|  |  | 4th | ...11 | 9 | 15...12 | 10 | 15...12 | 15 | 12 |
|  | $3^{rd}$FB | 3rd | ...7 | 6 | 14...11 | 9 | 12...9 | 14 | 11 |
|  |  | 4th | ...11 | 9 | 15...12 | 10 | 15...12 | 15 | 12 |
|  |  | 5th | ...13 | 10 | 16...13 | 11 | 16...14 | 16 | 13 |

Referring back to FIG. 2.

In Step 206, short bands of a triplet may be purged (eliminated). It should be noted that an occurrence of a band in the index matrix, can be defined by its duration (i.e., the number of time frames in a sequential band occurrence). A short band may be a band that its total number of time frames is smaller (shorter) than a minimal duration ($\epsilon$). It will be understood that step 206, of purging short bands may be conducted for all triplets of all feature matrixes, maxima and minima alike.

Figure 8:
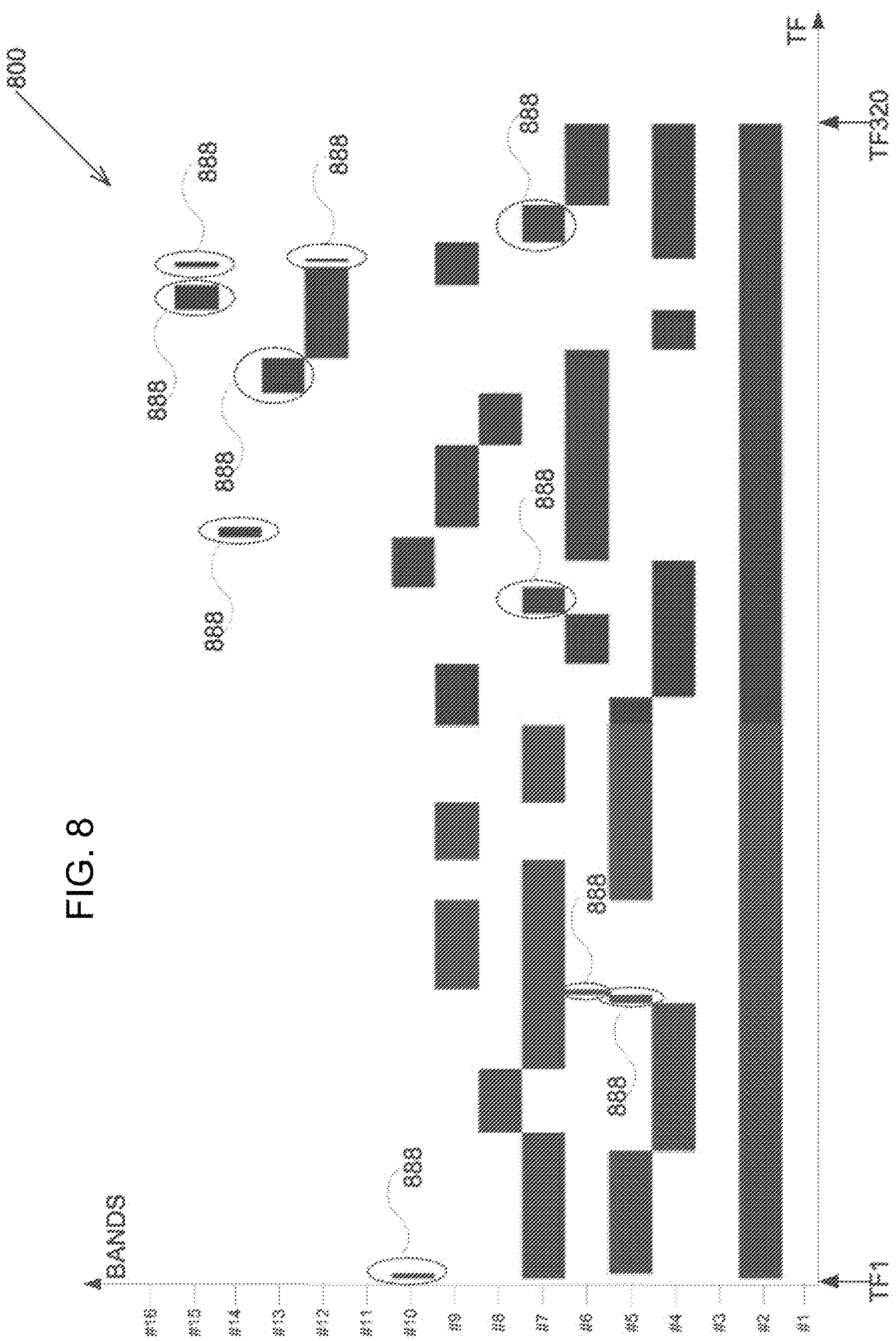
FIG. 8 depicts an occurrence of a frequency band triplet along time frames, of a band index matrix (index matrix), in accordance with some exemplary embodiments of the disclosed subject matter.

Referring now to FIG. 8 depicting an occurrence of a frequency band triplet (FBT) 800 along time frames, of a feature matrix, in accordance with some exemplary embodiments of the disclosed subject matter.

In some exemplary embodiments, FBT800 is visual representation of a single triplet, of a feature matrix, along the TF domain. The single triplet may be a $1^{st}$FB triplet, a $2^{nd}$FB triplet, a $3^{rd}$FB triplet of speech features values, either maxima or minima bands. It should be noted that no FBT700 may comprise more than three band occurrences in each TF.

In some exemplary embodiments, short bands 888 are portions of frequency bands, of the index matrix, that are falling below a threshold of minimum number [$\epsilon$] of consecutive time frames. Thus, may be filtered out. It should be understood that frequency bands falling below a threshold $\epsilon$ (system parameter of minimum number time frames) may be assigned with different values, according to feature matrix type, minima bands, maxima bands, a combination thereof, or the like.

Figure 9:
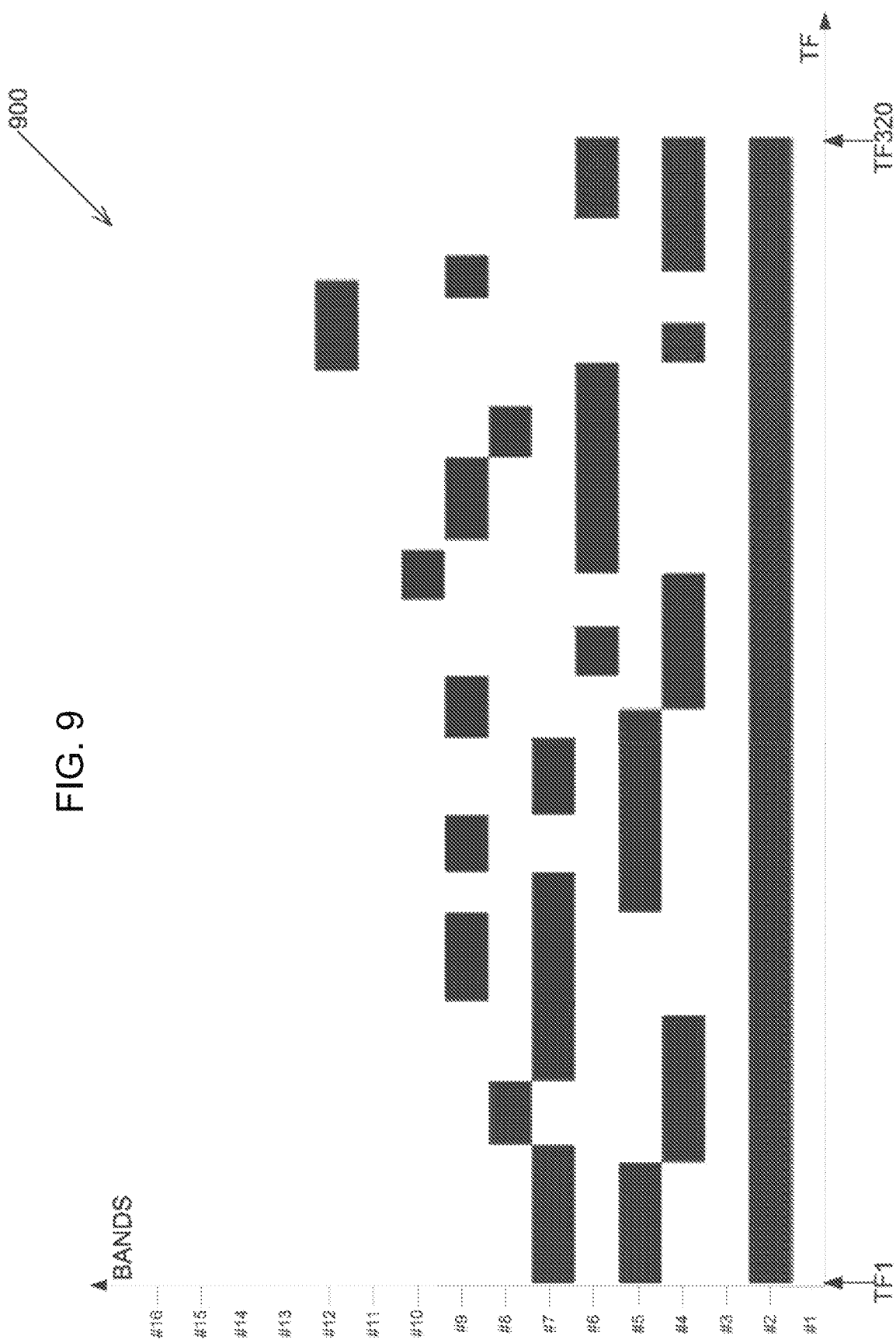
FIG. 9 depicts an occurrence of a frequency band triplet after purging short bands, in accordance with some exemplary embodiments of the disclosed subject matter.

Referring now to FIG. 9 depicting occurrences of a frequency band triplet 900 after purging short bands, in accordance with some exemplary embodiments of the disclosed subject matter. In some exemplary embodiments, the number of frequency band occurrences per time frame (TF) may be less-than or equal to 3.

Referring back to FIG. 2.

In Step 207, a time frame compression may be performed. In some exemplary embodiments, the time frame compression may be a process in which a plurality of contiguous time frames containing similar speech features values are compressed into a time interval (TI). The total number of TF per TI may vary from TI to TI. Also the number of TI is constant for the index matrix as well as the rest of the features matrixes of a segment. The process of compressing a plurality of TF into a TI will be described below, under the description of FIG. 10.

Figure 10:
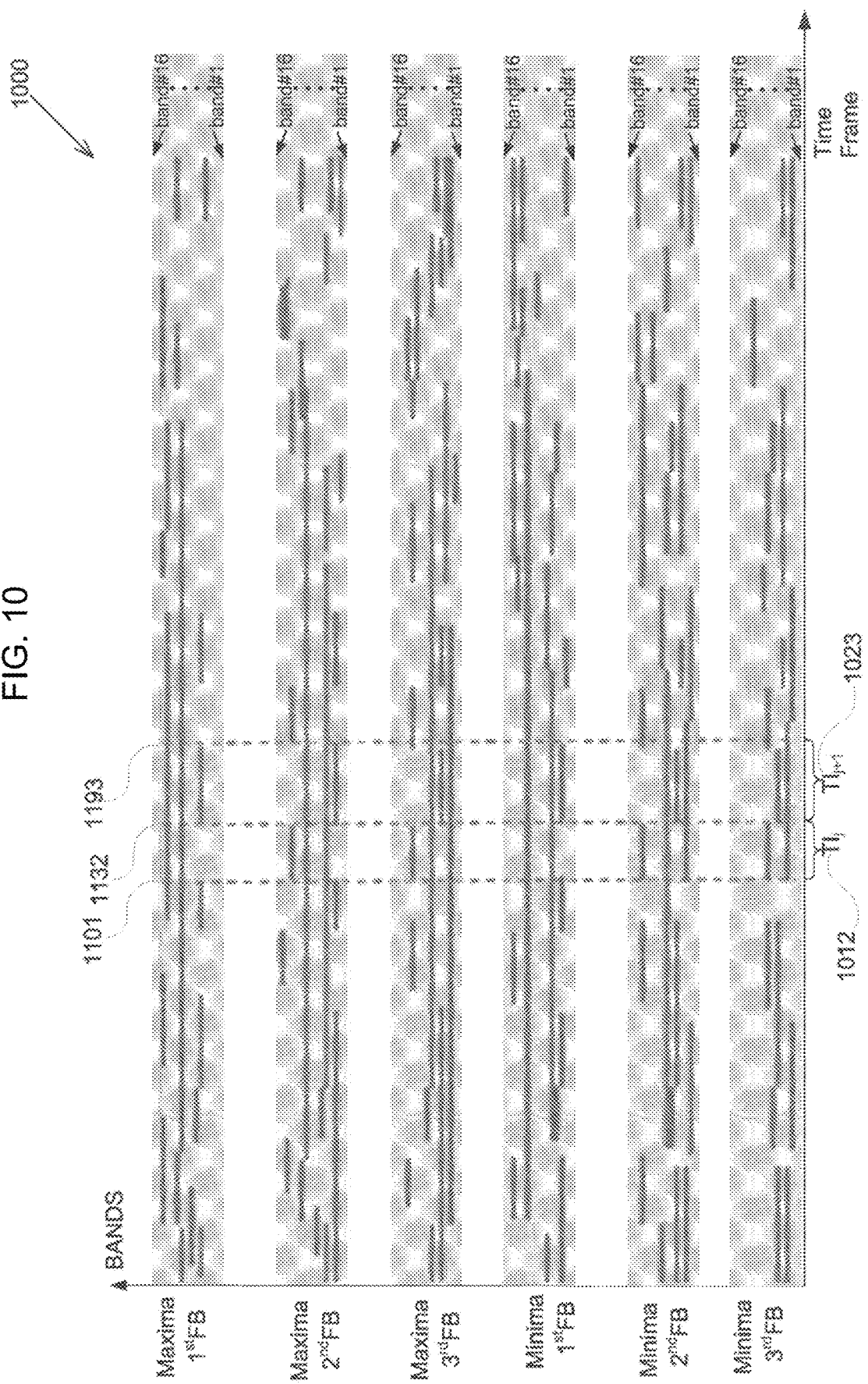
FIG. 10 shows a visual representation of aligning maxima and minima triplets' bands in an index matrix for compression process, in accordance with some exemplary embodiments of the disclosed subject matter.

Referring now to FIG. 10 showing, a visual representation of aligning maxima and minima triplet's bands in an index matrix (IM) 1000 for compression process, in accordance with some exemplary embodiments of the disclosed subject matter.

In some exemplary embodiments, TF1101 (TF number 101) may indicate a beginning of (time interval) TI1012 while TF1132 (TF number 132) may indicate an end of TI1012 and the beginning of time interval TI1023. Likewise TF1193 (TF number 193) may indicate an end of TI1023 and the beginning of the following time interval (not shown). Thus, in this exemplary embodiment, TI1012 comprises 31TFs and TI1023 comprises 70TFs. The process of compressing a plurality of TF into a TI may be done by scanning presence of each band (of the aligned maxima and minima triplet's bands in the IM) in each TF. In some exemplary embodiments, the time interval (TI) may sustain its continuity and increase its duration as long as no one of the bands has altered its presence along the time domain. It should be noted that the term "altered its presence" refers herewith to appearance of new band and/or disappearance of an accounted band in a following TF. Additionally or alternatively, the following TF may be marked as the end of TI and a beginning of a new TI, such as for example TF1132.

Referring back to FIG. 2 step 207.

Following the time frame compression the number of time intervals (#TI) may be smaller than the original number of time frames (#TF), (i.e. #TF>>#TI). Consequently the size of the index matrix as well the other features matrixes will be reduced to #TI by six triplets (i.e., $1^{st}$FB, $2^{nd}$ FB, $3^{rd}$FB triplets for maxima or minima). In addition two vectors comprising #TI values may be generated, wherein, the values in the first vector (TI duration vector) correspond to the ratio between number of TF in each TI divided by #TF and the values in the second vector (TI base frequency vector) correspond to a mathematical operation such as mean of the base frequency values of all TF within the TI.

In step 208, triplets of each feature matrix may be concatenated into one matrix for each feature in accordance with a concatenated index matrix. In some exemplary embodiments, the concatenating process of the index matrix comprises offsetting each triplet out of the six triplets in the following manner: 1 stFB of MaxB by 0; 2ndFB of MaxB by 17; 3rdFB of MaxB by 34; 1 stFB of MinB by 51; 2ndFB of MinB by 68; 3rdFB of MinB by 85. It will be appreciated that the frequency bands number offsetting may facilitate distinguishing between bands number as well pointing on the originating triplet in a concatenated index matrix. As an example, the following table #4 illustrates a concatenated index matrix, wherein #TI may be equal, for example, to 50.

It should be noted that in this disclosure the term "index component" refers to the first component of the segment vector, which is followed by features components. Wherein, the first operand of each component, of the plurality of components, correspond with the first pair (of bands) and the last operand correspond with the last possible combination of bands. In some exemplary embodiments, the values of the operands of the index component indicate presence or absence of pairs based on the index matrix. For example, based on the data in Table 4, all pairs that may comprise bands 3-3 or bands 9-3 may be "absent pairs" since bands 3-3 or 9-3 don't exist in the index matrix. A present pair comprises two bands that exist in the index matrix. In some exemplary embodiments, operands having value equal to "0" indicate an absent pair and operands having value equal to "1" indicate a present pair. It should also be noted that, the segment vector further comprises inner relations that carry extra information necessary for the speech recognition. The concept of bands pairing as disclosed in the present invention is tied closely to the "gestalt effect". The gestalt effect refers to the capability of determining whole forms, particularly with respect to the speech recognition, of words and syllables instead of just collections of the speech elements components. That is to say that the present disclosure seeks for the relations between all the elements in a segment instead of considering them independently or through local relations.

In some exemplary embodiments, the components of the plurality of components that follow the first (index) component may be features components comprising identical

TABLE #4

| | TI1 | TI2 | TI3 | TI | TI48 | TI49 | TI50 | | | |
|---|---|---|---|---|---|---|---|---|---|---|
| Add 0 to | 2 | 1 | 1 | ... | 2 | 4 | 2 | 1st | $1^{st}$FB | Minima Bands |
| each | 4 | 2 | 2 | ... | 4 | 6 | 4 | 2nd | | |
| band | 6 | 7 | 7 | ... | 6 | 8 | 6 | 3rd | | |
| Add 17 | 4 + 17 = 21 | (2) 19 | (2) 19 | ... | (4) 21 | (6) 23 | (4) 21 | 2nd | $2^{nd}$FB | |
| to each | 6 + 17 = 23 | (7) 24 | (7) 24 | ... | (6) 23 | (8) 25 | (6) 23 | 3rd | | |
| band | 8 + 17 = 25 | (11) 28 | (11) 28 | ... | (10) 27 | (10) 27 | (8) 25 | 4th | | |
| Add 34 | 6 + 34 = 40 | (7) 41 | (7) 41 | ... | (6) 40 | (8) 42 | (6) 40 | 3rd | $3^{rd}$FB | |
| to each | 8 + 34 = 42 | (11) 45 | (11) 45 | ... | (10) 44 | (10) 44 | (8) 42 | 4th | | |
| band | 15 + 34 = 49 | (13) 47 | (13) 47 | ... | (13) 47 | (12) 46 | (15) 49 | 5th | | |
| Add 51 | 1 + 51 = 52 | (12) 63 | (3) 54 | ... | (7) 58 | (1) 52 | (9) 60 | 1st | $1^{st}$FB | Maxima Bands |
| to each | 3 + 51 = 54 | (13) 64 | (5) 56 | ... | (8) 59 | (2) 53 | (10) 61 | 2nd | | |
| band | 7 + 51 = 58 | (14) 65 | (6) 57 | ... | (9) 60 | (14) 65 | (11) 62 | 3rd | | |
| Add 68 | 3 + 68 = 71 | (13) 81 | (5) 73 | ... | (8) 76 | (2) 70 | (10) 78 | 2nd | $2^{nd}$FB | |
| to each | 7 + 68 = 75 | (14) 82 | (6) 74 | ... | (9) 77 | (14) 82 | (11) 79 | 3rd | | |
| band | 11 + 68 = 79 | (15) 83 | (9) 77 | ... | (12) 80 | (15) 83 | (12) 80 | 4th | | |
| Add 85 | 7 + 85 = 92 | (14) 99 | (6) 91 | ... | (9) 94 | (14) 99 | (11) 96 | 3rd | $3^{rd}$FB | |
| to each | 11 + 85 = 96 | (15) 100 | (9) 94 | ... | (12) 97 | (15) 100 | (12) 97 | 4th | | |
| band | 13 + 85 = 98 | (16) 101 | (10) 95 | ... | (14) 99 | (16) 101 | (13) 98 | 5th | | |

Additionally or alternatively, the features matrix may have identical structure as the index matrix and values of each feature matrix correspond with the frequency band number dictated by the index matrix.

In step 209 a segment vector may be determined. In some exemplary embodiments, each speech segment, such as SS333 of FIG. 3, may be represented by a segment vector, having a consistent structure, comprising properties of bands pairs of all the features (extracted from the features matrixes). The vector may be compiled of a plurality of components, wherein each component comprises equal number of operands. In some exemplary embodiments, the number of operands may equate to all possible combinations of bands pairs. Hence, according to the example depicted in table 4, there are a total of 102 possible bands (0 through 101); therefore, there are 102×102=10404 possible combinations of pairs.

number of operands as the index component. Each feature may be characterized by at least one component, wherein, each component of the at least one component represent one feature matrix. Additionally, each operand of the at least one component contains a plurality of properties derived from the feature matrix that is associated with the at least one component.

In some exemplary embodiments, the properties of each operand (pair) may be determined. The properties reflect an impact of the pair's aggregated presence, in the feature matrix, along the segment's (spectrogram) time domain. Wherein, the impact is characterized by cross effects, of the feature values, between different time fragments in the segment. That is to say those properties of operands, having pairs presence, of each feature component are determined by calculating cross effect between sets of aggregated pairs.

Wherein each set of aggregated pairs may be associated with a predetermined time zone of the speech segment.

It will be understood, that all segment vectors may be stored in a vectors database (Vdb) located in a repository (not shown) of the machine learning server 136, of FIG. 1, or the like. The Vdb may comprise all preceding segment vectors, wherein each vector has at least one label, which comprises at least one alphanumeric character, manifesting a speech segment represented by the each vector. In some exemplary embodiments, a label may be a representation of an accent, pronunciation level, age of the speaker, gender of the speaker, image identification, a combination thereof, or the like.

In step 210, machine learning classification may be deployed to determine at least one label of a new segment vector. In some exemplary embodiments, a machine learning algorithm may be utilized to classify an incoming segment vector based on segment vectors and their labels stored in the Vdb.

In step 211, at least one label of the last incoming segment vector may be outputted. In some exemplary embodiments, the at least one label may be outputted to a user via a computer, a smartphone, a laptop computer, a tablet PC, such as client 120 of FIG. 1.

The present invention may be a system, a method, and/or a computer program product. The computer program product may include a computer readable storage medium (or media) having computer readable program instructions thereon for causing a processor to carry out aspects of the present invention.

The automatic speech recognition system and methods of the disclosed subject matter, as described above may be equally utilized for automatic voice recognition and automatic image recognition.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of speech recognition, voice recognition, and a combination thereof, sequentially executed by at least one processor, on a plurality of consecutive segments, the method comprising:
obtaining digital information of a segment selected from the group consisting of speech segment, voice segment, and a combination thereof, wherein the digital information comprises a spectrogram representation;
extracting a plurality of features characterizing the segment from the spectrogram representation;
determining a consistent structure segment vector based on the features;
deploying machine learning to determine at least one label of the segment vector; and outputting the at least one label;
wherein the extracting a plurality of features further comprises assembling a plurality of matrixes and an index matrix, having identical number of cells, wherein each matrix of the plurality of matrixes represent a different feature of the plurality of features, wherein assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a feature value of a time frame and a frequency band indicated by the index matrix, wherein one or more portions of frequency bands of the index matrix falling below a threshold of minimum number of consecutive time frames are filtered out of the index matrix and the plurality of matrixes.

2. The method of claim 1, wherein said obtaining digital information further comprises digitizing, by the at least one processor, an analog signal originated from a device having a microphone in real time or from a device having an audio recording, wherein, the analog signal comprising analog voice portions and non-voice portions; and wherein the digitizing of the analog voice portion produces the digital information of a segment.

3. The method of claim 1, wherein the segment represents an element selected from the group consisting of a syllable, a plurality of syllables, a word, a fraction of a word, a plurality of words, and any combination thereof.

4. The method of claim 1, wherein the extracting a plurality of features further comprises assembling a plurality of matrixes and an index matrix, having identical number of cells, wherein each matrix of the plurality of matrixes represent a different feature of the plurality of features, wherein assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a feature value of a time frame and a frequency band indicated by the index matrix.

5. A method of speech recognition, voice recognition, and a combination thereof, sequentially executed by at least one processor, on a plurality of consecutive segments, the method comprising:
obtaining digital information of a segment selected from the group consisting of speech segment, voice segment, and a combination thereof, wherein the digital information comprises a spectrogram representation;
extracting a plurality of features characterizing the segment from the spectrogram representation;
determining a consistent structure segment vector based on the features;
deploying machine learning to determine at least one label of the segment vector; and outputting the at least one label;
wherein the extracting a plurality of features further comprises assembling a plurality of matrixes and an index matrix, having identical number of cells, wherein each matrix of the plurality of matrixes represent a different feature of the plurality of features, wherein assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a feature value of a time frame and a frequency band indicated by the index matrix, wherein contiguous time frames containing similar features values are replaced with a time interval in the index matrix and the plurality of matrixes.

6. A method of speech recognition, voice recognition, and a combination thereof, sequentially executed by at least one processor, on a plurality of consecutive segments, the method comprising:
obtaining digital information of a segment selected from the group consisting of speech segment, voice segment, and a combination thereof, wherein the digital information comprises a spectrogram representation;
extracting a plurality of features characterizing the segment from the spectrogram representation;
determining a consistent structure segment vector based on the features;
deploying machine learning to determine at least one label of the segment vector; and outputting the at least one label;
wherein the extracting a plurality of features further comprises assembling a plurality of matrixes and an index matrix, having identical number of cells, wherein each matrix of the plurality of matrixes represent a different feature of the plurality of features, wherein assembling the index matrix is based on a spectrogram having time frames and frequency bands, wherein the index matrix dimensions correlates with the time frames and frequency bands of the spectrogram, wherein the plurality of matrixes overlap with the index matrix, and wherein a content of each cell of each matrix of the plurality of matrixes represents a feature value of a time frame and a frequency band indicated by the index matrix, wherein the determining a consistent structure segment vector further comprises compiling a plurality of components each comprising equal number of operands, wherein the first component of the plurality of components is an index component corresponding with the index matrix while the rest of the plurality of components are features components corresponding with the features matrixes, wherein a total number of operands is all possible combinations of frequency bands pairs, and wherein the index component indicates operands having band pairs presence in the segment vector.

7. The method of claim 6, wherein the segment vector further comprises inner relations that carry extra information necessary for the speech recognition and the voice recognition.

8. The method of claim 6, wherein properties of operands, having pairs presence, of each feature component are determined by calculating cross effect between sets of aggregated pairs, wherein each set of aggregated pairs is associated with a predetermine time zone of the segment.

9. The method of claim 6, wherein deploying machine learning further comprises classifying a segment vector based on preceding segment vectors and their labels, wherein each vector has at least one label comprising at least one alphanumeric character manifestation of a speech segment or a voice segment.

10. A system configured to execute the method of claim 1 the system comprising:
at least one client device configured to communicate information;
wherein the at least one processor executes a code for determining a consistent structure segment vector based on features selected from the group comprising of speech features, voice features, and any combination thereof; and at least one label of the segment vector.

11. The system of claim 10, wherein the at least one client device is further configured to obtain the information from devices selected from the group consisting of a real time sound system and a sound recording system.

12. The system of claim 10, wherein the information further comprises information for interfacing with a user.

13. The system of claim 10, wherein the at least one client device is adapted to perform duties selected from the group consisting of duties attributed to the segment vector generator, duties attributed to the machine learning server, and a combination thereof.

14. The system of claim 10, wherein the at least one client device is further configured to obtain the information from devices selected from the group consisting of image capturing, video capturing, images storage, video storage, and any combination thereof.

15. The system of claim 10, wherein the at least one client device is adapted to perform duties selected from the group consisting of duties attributed to the segment vector generator, duties attributed to the machine learning server, and a combination thereof.

* * * * *